United States Patent [19]

Ginsberg et al.

[11] 4,239,539
[45] Dec. 16, 1980

[54] AMINOSILANE MODIFIED ZINC-RICH COATING COMPOSITIONS

[75] Inventors: Thomas Ginsberg, Piscataway; Lawrence G. Kaufman, Somerville, both of N.J.

[73] Assignee: Union Carbide Corporation, New York, N.Y.

[21] Appl. No.: 51,513

[22] Filed: Jun. 25, 1979

[51] Int. Cl.³ .................... C09D 5/10; C23F 11/00
[52] U.S. Cl. .................... 106/1.17; 106/14.44; 106/287.11; 252/389 R; 252/390; 427/327; 427/383.7; 427/387; 427/421
[58] Field of Search .............. 106/1, 14.44, 287.17, 106/1.17, 287.11; 252/390, 389 R; 427/327, 421, 383.7, 387

[56] References Cited

U.S. PATENT DOCUMENTS

| | | | |
|---|---|---|---|
| 2,929,829 | 3/1960 | Morehouse | 528/29 X |
| 3,653,930 | 4/1972 | Law et al. | 106/1.17 |
| 3,832,204 | 8/1974 | Boaz | 106/287.11 |
| 3,961,977 | 6/1976 | Koda et al. | 106/287.11 |
| 4,084,971 | 4/1978 | Ginsberg | 252/390 X |

FOREIGN PATENT DOCUMENTS 154835  12/1949  Australia .................... 106/1.17

*Primary Examiner*—Ronald H. Smith
*Assistant Examiner*—Thurman K. Page
*Attorney, Agent, or Firm*—Bernard Francis Crowe

[57] ABSTRACT

Single-package zinc-rich coating compositions are provided by blending zinc, a partially hydrolyzed organic silicate and an aminoorganosilicon acylamino compound.

11 Claims, No Drawings

AMINOSILANE MODIFIED ZINC-RICH COATING COMPOSITIONS

BACKGROUND OF THE INVENTION

This invention pertains to single-package zinc-rich coatings and more particularly to blends of zinc, partially hydrolyzed alkyl silicates and an organosilicon acylamino compound.

Zinc-rich coatings are effective in protecting steel against corrosion. The principle of this protective action is attributed to the fact that zinc, being higher than iron in the electromotive series of the elements reacts first in any environment conducive to the ionic dissolution (oxidation) of metals, thereby protecting the steel substrate.

As the name implies, zinc-rich coatings contain a high concentration of zinc in the dry film. This is required so as to provide the electrical continuity and, therefore, the conductivity necessary for the electrochemical process to take place.

In order to obtain these zinc-rich coatings on a ferrous substrate, a paint formulation containing very fine zinc dust produced by distilling the metal under controlled conditions of condensation is used. When the paint is applied, the metallic powder is held in place on the surface by a binder matrix. Zinc-rich coatings are classified, according to the nature of the binder, into organic or inorganic coatings.

Organic zinc-rich coatings utilize synthetic polymers as binders. Although such coatings afford effective corrosion protection, their heat and solvent resistance are limited.

Inorganic binders do not have these limitations. Such binders include water-soluble silicates, which are insolubilized by a curing composition after application, and alkyl silicates which do not require post cure. Although alkyl silicates contain organic chains, the resulting zinc-rich coatings are classified as inorganic because it is believed that, upon drying, a totally inorganic matrix of $SiO_2$ is formed. This reaction takes place slowly and proceeds through continuous stages of hydrolysis. The alkyl silicates that may be used in zinc-rich coatings may vary in their level of hydrolysis. If an alkyl silicate having a very low level of hydrolysis is used, the curing reaction is so slow that the film remains uncured for prolonged periods of time. Using alkyl silicates hydrolyzed to higher levels reduces the time necessary to obtain dry films. Unfortunately as the drying time decreases due to the higher degree of hydrolysis, the stability of the product in turn decreases. This lower stability is manifested in various ways. One is an increasing tendency for the paint to gel in the container upon storage. Another is a diminished pot life when alkyl silicate is mixed with the zinc dust in which case gelling usually occurs in a few hours.

One way to avoid instability of the paint composition in the container and premature gellation with the zinc, is to package the zinc separately from the alkyl silicate and mix the two components just prior to application.

This is done commercially in the so-called 2-package zinc-rich coating compositions and the field has adapted its working methods to this characteristic of the product or paint used to provide the coatings. However, the problems inherent in a 2-component coating composition, viz., doubled production, warehousing, stocking and inventory, as well as metering and mixing on site coupled with limited pot life makes a single-component zinc-rich paint primer composition very desirable.

If zinc-rich coatings are made the alkyl silicates of low degress of hydrolysis, stability of the alkyl silicate in its container as well as the pot life of primer composition after addition of the zinc dust to the alkyl silicate improves considerably. The price to this improved stability, however, is a much lengthened drying time. The problem facing the formulator is therefore how to obtain curing of a single-package alkyl silicate, zinc-rich paint primer composition in a reasonably short time, while maintaining good package stability in conjunction with nonreactivity of the alkyl silicate with the zinc dust.

Several proposed solutions for this problem have been put forth in the prior art. Thus, for example in U.S. Pat. No. 3,653,930 a single-package, zinc-rich coating was obtained by the addition of low molecular weight amines to ethyl silicate hydrolyzed to about 40% together with nitro compounds to prevent gassing. The same general approach was also described in Netherlands Pat. No. 6,900,729.

In U.S. Pat. No. 3,660,119 film formation of a 40% hydrolyzed alkyl silicate was obtained through the use of strong bases, such as, sodium or potassium methoxide or ethoxide.

U.S. Pat. No. 3,859,101 discloses use of zinc chromate instead of nitro compounds as anti-gassing additives in a mixture of alkyl silicate and zinc dust.

U.S. Pat. No. 3,917,648 utilizes a reaction product of alkyl silicates with polyols to form a product which is stable in the presence of zinc.

U.S. Pat. No. 4,084,971 provides a single package alkyl silicate-zinc primer composition containing fatty amido amines to impart stability.

The prior art references recited above suffer the following disadvantages:

1. Low molecular weight amines are volatile and therefore alkyl silicate binders containing them lose effectiveness upon storage.
2. Low molecular weight amines are water-soluble therefore introducing a factor of water sensitivity into a coating primarily intended for corrosion protection.
3. Low molecular weight amines have high chemical reactivity. Thus they react with acids such as those produced by absorbed carbon dioxide during storage. This may account for their loss of effectiveness with time.
4. Low molecular weight amines present in the coating formed on the ferrous substrate have adverse effects on the resistance of the zinc-rich film to environmental agents and interfere with the adhesion and chemical resistance of top coats applied to the primer coat.
5. Low molecular weight amines are toxic, representing a potential safety hazard to those coming in contact with the coating compositions.
6. Strong bases such as alkali metal alkoxides or their corresponding hydroxide by-products adversely affect a metal of amphoteric character such as zinc.
7. The alkali metal alkoxides or their corresponding hydroxide by-products remain in the zinc-rich film formed on the ferrous substrate, introducing an element of water and chemical sensitivity which may affect the performance of top coats applied to the primer coat.
8. Polyol silicate and fatty amido amine zinc-rich coatings produce films which do not exhibit hardness levels which are often demanded by the industry.

It is therefore an object of the present invention to provide a zinc-rich coating composition containing an alkyl silicate which as a primer paint coating composition remains stable when packaged for prolonged periods of time. It is another object to provide coating compositions which upon application to a ferrous substrate rapidly form a dry, hard, corrosion-resistant protective primer film.

SUMMARY OF THE INVENTION

The objectives enumerated above have been achieved with compositions comprising particulate zinc, an unhydrolyzed or a partially hydrolyzed organic silicate hydrolyzed up to about 40% hydrolysis and a hardening amount of an aminoorganosilicon acylamino compound having the formula:

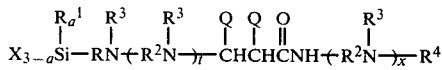

wherein:
- X is an alkoxy radical having 1 to 6 carbon atoms;
- R is a alkylene radical having 1 to 4 carbon atoms;
- $R^1$ is hydrogen or an alkyl radical having 1 to 4 carbon atoms;
- $R^2$ is an alkylene radical having 2 to 4 carbon atoms;
- $R^3$ is a monovalent radical selected from the group consisting of hydrogen alkyl having 1 to 20 carbon atoms or phenyl;
- $R^4$ is a monovalent radical selected from the group consisting of alkyl having 1 to 20 carbon atoms, phenyl or silyl having the formula:

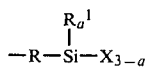

wherein X, R and $R^1$ are as defined above;

Q is a monovalent radical selected from the group consisting of hydrogen, alkyl having 1 to 4 carbon atoms, phenyl or an ester radical having the formula —COOR$^5$ wherein $R^5$ is alkyl having 1 to 4 carbon atoms; and a is an integer having values of 0 to 2 and t and x are each integers having a value of 0 to 4 with the proviso that when x is at least 1, $R^4$ can also be hydrogen.

Illustrative radicals represented by X above include alkoxy radicals having 1 to 6 carbon atoms, such as methoxy, ethoxy, propoxy, 2-methoxyethoxy, 2-ethoxyethoxy, isopropoxy, hexyloxy and the like, the preferred alkoxy radicals being methoxy, ethoxy, 2-ethoxyethoxy and 2-methoxyethoxy. Illustrative alkylene radicals represented by R above include methylene, ethylene, propylene, isopropylene, butylene and the like, the preferred alkylene groups being ethylene ($—C_2H_4—$) and propylene ($—C_3H_6—$). Illustrative radicals represented by $R^1$ above include alkyl radicals such as methyl, ethyl, propyl, isopropyl, butyl and the like. Illustrative divalent alkylene radicals represented by $R^2$ above include ethylene, propylene, isopropylene, butylene, and the like, the preferred divalent alkylene groups being ethylene and propylene. Illustrative radicals represented by $R^3$ above include hydrogen, phenyl and alkyl radicals having from 1 to 20 carbon atoms such as methyl, ethyl, propyl, octyl, octadecyl, eicosyl and the like. Preferably $R^3$ is hydrogen. Illustrative radicals represented by $R^4$ above include hydrogen, phenyl, alkyl radicals having from 1 to 20 carbon atoms such as methyl, ethyl, propyl, octyl, octadecyl, eicosyl, and the like as well as silyl groups of the formula

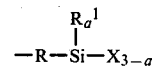

wherein R, $R^1$, X and a are the same as defined above. Preferably $R^4$ represents a silyl group. Illustrative radicals represented by Q above include hydrogen, phenyl, alkyl radicals having from 1 to 4 carbon atoms such as methyl, ethyl, propyl, butyl and the like, as well as ester radicals of the formula

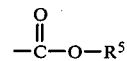

wherein $R^5$ represents an alkyl radical having from 1 to 4 carbon atoms such as methyl, ethyl, propyl, butyl, and the like. Preferably Q is hydrogen. In the more preferred aminoorganosilicon acylamino compounds of this invention a is preferably 0. Of course, it is understood that each individual radical or group represented by the above symbols may be the same or different in any given compound.

The aminoorganosilicon acylamino compounds of this invention can be prepared by following simple processing procedures involving the use of Michael addition products as the starting materials. For example, amino-silane compounds of the formula

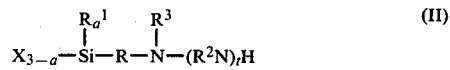  (II)

where X, $R^1$, $R_2$, $R_3$, a and t are the same as defined above can be reacted with an olefinic carboxylate ester by the Michael addition method to form the corresponding amino-carboxylic acid ester of the silane and carboxylate materials employed as seen by the following illustration:

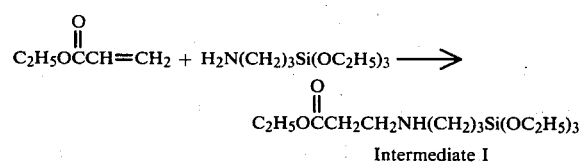

Intermediate I

The amino-carboxylic acid ester-silane intermediate product so formed can then be subsequently amidated with either (1) a primary amino silicon compound of Formula (II) above, (2) a primary organoamine, or (3) a primary organic polyamine to produce the desired aminoorganosilicon acylamino compounds of this invention depicted by Formula (I) above as seen by the following illustrations

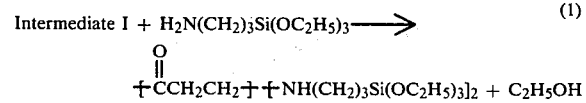  (1)

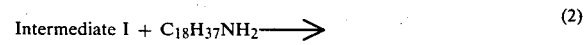  (2)

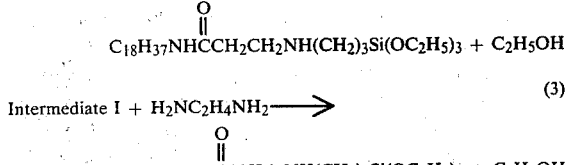

(3)

Intermediate I + H$_2$NC$_2$H$_4$NH$_2$ ⟶

The amino-carboxylic acid ester containing silane compounds employable as the starting materials for such types of processes as depicted above and/or the Michael addition method for their preparation are well known in the art as seen for example by U.S. Pat. No. 2,929,829 and may be illustrated by the following formula

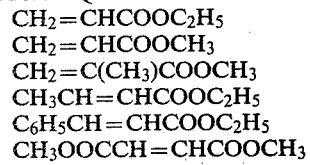 (III)

wherein R, R$^1$, R$^2$, R$^3$, Q, X, a and t are the same as defined above and R$^6$ is a monovalent hydrocarbon radical, preferably an alkyl radical having 1 to 4 carbon atoms such as methyl, ethyl, propyl, butyl, and the like.

Illustrative examples of olefinic carboxylate compounds which may be employed in such a Michael addition process include those of the formula

Q(CH)=C(Q)COOR$^6$ (IV)

wherein Q and R$^6$ are the same as defined above such as,
CH$_2$=CHCOOC$_2$H$_5$
CH$_2$=CHCOOCH$_3$
CH$_2$=C(CH$_3$)COOCH$_3$
CH$_3$CH=CHCOOC$_2$H$_5$
C$_6$H$_5$CH=CHCOOC$_2$H$_5$
CH$_3$OOCCH=CHCOOCH$_3$
and the like.

Illustrative aminosilanes that can be employed in such a Michael addition process include those of Formula (II) above such as
(CH$_3$O)$_3$SiCH$_2$NH$_2$
(C$_2$H$_5$O)$_3$Si(CH$_2$)$_3$NH$_2$
(CH$_3$O)$_3$Si(CH$_2$)$_3$NH$_2$
(CH$_3$O)$_3$Si(CH$_2$)$_3$NHCH$_3$
(C$_3$H$_7$O)$_3$Si(CH$_2$)$_3$NH$_2$
(CH$_3$OC$_2$H$_4$O)$_3$Si(CH$_2$)$_3$NH$_2$
(C$_2$H$_5$O)$_2$CH$_3$Si(CH$_2$)$_3$NH$_2$
(C$_2$H$_5$O)$_2$C$_2$H$_5$Si(CH$_2$)$_3$NH$_2$
(C$_2$H$_5$O)$_3$Si(CH$_2$)$_2$NH$_2$
(C$_2$H$_5$O)$_3$SiCH$_2$CH$_2$CH(CH$_3$)NH$_2$
(C$_2$H$_5$O)$_3$Si(CH$_2$)$_4$NH$_2$
(CH$_3$O)$_3$Si(CH$_2$)$_3$NH(CH$_2$)$_2$NH$_2$
(C$_4$H$_9$O)$_2$(CH$_3$)Si(CH$_2$)$_3$NHCH$_3$
(CH$_3$O)$_3$Si(CH$_2$)$_3$(NHC$_2$H$_4$)$_2$NH$_2$
(CH$_3$O)$_3$Si(CH$_2$)$_3$(NHC$_2$H$_4$)$_3$NH$_2$
(C$_2$H$_5$O)$_3$Si(CH$_2$)$_3$(NHC$_2$H$_4$)$_4$NH$_2$
(C$_2$H$_5$O)$_2$CH$_3$Si(CH$_2$)$_4$NH$_2$
(CH$_3$O)(CH$_3$)$_2$Si(CH$_2$)$_4$NH$_2$
(CH$_3$O)$_3$Si(CH$_2$)$_3$NHC$_4$H$_9$
(C$_2$H$_5$O)$_3$Si(CH$_2$)$_3$NHCH$_3$
(C$_2$H$_5$O)$_3$SiCH$_2$CH(CH$_3$)NH$_2$
and the like.

The processing conditions of said Michael addition are well known and taught e.g. in U.S. Pat. No. 2,929,829 and in this instance, merely involve forming a mixture of about 1 mole of the aminosilicon compound and about one mole of the olefinic carboxylate compound and maintaining the mixture at a temperature, preferably about room temperature, until the aminosilicon compound has added to the double bond of the olefinic carboxylate thereby producing the desired Michael addition product.

As pointed out above the aminoorganosilicon acylamino compounds of this invention as shown by Formula (I) above can be produced by amidating an amino-carboxylic acid ester containing silane of Formula (III) above with either (1) a primary aminosilane compound of Formula (II) above; (2) a primary organic amine or (3) a primary organic polyamine.

Illustrative primary aminosilane reactants include those of the formula

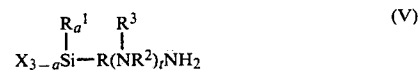 (V)

wherein R, R$^1$, R$^2$, R$^3$, X, a and t are the same as defined above such as
(CH$_3$O)$_3$SiCH$_2$NH$_2$
(C$_2$H$_5$O)$_3$Si(CH$_2$)$_3$NH$_2$
(CH$_3$O)$_3$Si(CH$_2$)$_3$NH$_2$
(CH$_3$O)$_3$Si(CH$_2$)$_4$NH$_2$
(C$_3$H$_7$O)$_3$Si(CH$_2$)$_3$NH$_2$
(CH$_3$OC$_2$H$_4$O)$_3$Si(CH$_2$)$_3$NH$_2$
(C$_2$H$_5$O)$_2$CH$_3$Si(CH$_2$)$_3$NH$_2$
(C$_2$H$_5$O)$_2$C$_2$H$_5$Si(CH$_2$)$_3$NH$_2$
(C$_2$H$_5$O)$_3$SiCH$_2$CH$_2$CH(CH$_3$)NH$_2$
(C$_2$H$_5$O)$_3$Si(CH$_2$)$_4$NH$_2$
(CH$_3$O)$_3$Si(CH$_2$)$_3$NH(CH$_2$)$_2$NH$_2$
(CH$_3$O)$_3$Si(CH$_2$)$_3$(NHC$_2$H$_4$)$_2$NH$_2$
(CH$_3$O)$_3$Si(CH$_2$)$_3$(NHC$_2$H$_4$)$_3$NH$_2$
(C$_2$H$_5$O)$_3$Si(CH$_2$)$_3$(NHC$_2$H$_4$)$_4$NH$_2$
(C$_2$H$_5$O)$_2$(CH$_3$)Si(CH$_2$)$_4$NH$_2$
(CH$_3$O)(CH$_3$)$_2$Si(CH$_2$)$_4$NH$_2$
(C$_2$H$_5$O)$_3$SiCH$_2$CH(CH$_3$)NH$_2$
and the like.

Illustrative primary organic amines include those of the formula

R$^7$NH$_2$ VI wherein R$^7$ is a monovalent hydrocarbon radical having from 1 to 20 carbon atoms, such as methylamine, ethylamine, propylamine, octylamine, octadecylamine, eicosylamine, phenylamine, and the like.

Illustrative primary organic polyamines include those of the formula

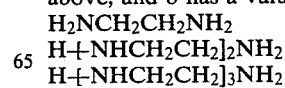 (VII)

wherein R$^2$, R$^3$, R$_4$ and R$^4$ are the same as defined above, and b has a value of 1 to 4, such as:
H$_2$NCH$_2$CH$_2$NH$_2$
H─[NHCH$_2$CH$_2$]$_2$NH$_2$
H─[NHCH$_2$CH$_2$]$_3$NH$_2$ H(̵NHCH$_2$CH$_2$]$_4$NH$_2$
H$_2$NCH$_2$CH$_2$CH$_2$NH$_2$
H(̵NHCH$_2$CH$_2$CH$_2$]$_2$NH$_2$
H(CH$_3$)NCH$_2$CH$_2$NH$_2$
H(C$_2$H$_5$)NCH$_2$CH$_2$NH$_2$
H(C$_4$H$_9$)NCH$_2$CH$_2$NH$_2$
H(C$_6$H$_5$)NCH$_2$CH$_2$NH$_2$
(CH$_3$)$_2$NCH$_2$CH$_2$NH$_2$
(C$_2$H$_5$)$_2$NCH$_2$CH$_2$NH$_2$
H$_2$NCH$_2$CH$_2$NHCH$_2$CH$_2$CH$_2$NH$_2$
and the like.

Of course, it is obvious that the particular choice of amidation processes will merely depend upon which type of silane product is desired and that all three of the above depicted amidation processes can be carried out merely by forming a mixture of a carboalkoxyalkylaminoorganosilane such as shown in Formula (III) above with any of the amino compounds shown in Formulas (V), (VI) or (VII) above and maintaining the mixture at a temperature at which the carboalkoxy group and primary amino group react to produce the desired aminoorganosilicon acylamino compound.

The relative amounts of the two reactants used as the starting materials for said above amidation processes are not narrowly critical. For example, from one to ten chemical equivalents of primary amine starting materials of Formulas (V), (VI) or (VII) can be employed for such mole of the carboalkoxyalkylaminosilane of Formula III above. However, an excess of such primary amine reactants is not desirable unless the unreacted excess can be readily removed from the reaction mixture or does not interfere with the intended use of the desired silane condensation product. In general, however, when the amino starting material is an aminosilane of Formula (V) above or a primary amine of Formula (VI) above or a primary polyamine of Formula (VII) above that contains only one primary amino group it is preferred that the carboalkoxyalkylaminoorganosilane starting material be reacted with a stoichiometric amount (1 mole to 1 mole) of said amino starting materials. On the other hand, when the amino starting material is a primary polyamine of Formula (VII) above that contains two primary amino groups it is essential to employ a stoichiometric excess of said polyamine in order to avoid producing bis-silylated compounds containing more than a single acylamino group. Moreover, while it is preferred to prepare the aminoorganosilicon acylamino compounds of this invention by first forming the amino carboxylic acid ester containing silane intermediate of Formula (III) above and then reacting said intermediate with the primary amino starting material it is to be understood that, if desired the bis silylated compounds of this invention can also be prepared in a single step for example, by reacting an olefinic compound of Formula (IV) above that contains only one carboalkoxy group with a primary aminosilane of Formula (V) above using a mole ratio of 0.5 moles of the carboxylate compound to 1 mole of the aminosilane. It is generally preferred to employ an olefinic carboxylate starting material which contains the same type of alkoxy group as the alkoxy radicals of the aminosilane starting material since when different alkoxy groups are involved (e.g. in the reaction of methyl acrylate and a triethoxy containing silane starting material the process can lead to a mixed methoxy-ethoxy silane adduct intermediate and/or an acylamino containing mixed methoxy-ethoxy silane product.

The above amidation processes may be carried out over a wide range of temperatures such as from 0° C. to 200° C.; however, it is generally preferred to employ a temperature in the range of from about 25° C. to about 150° C. The by-product alcohol may be removed by any conventional method such as by distillation and pressures other than atmospheric pressure may be used to aid in the removal of the alcohol if desired. Of course, it is to be understood that the aminoorganosilicon acylamino compounds of this invention can be employed in their crude product form or purified if desired after removal of the alcohol by any conventional method such as further distillation. Moreover, it is often desirable to employ a catalyst to accelerate the condensation reaction (amidation) between the carboalkoxy group and primary amino group of the starting materials. Illustrative catalysts which may be employed for this purpose are the tin catalysts described in U.S. Pat. No. 2,890,208 as well as other metal catalysts such as those described in U.S. Pat. No. 3,169,945.

Accordingly, illustrative aminoorganosilicon acylamino compounds of this invention include such compounds as $$[\text{CCH}_2\text{CH}_2\overset{\text{O}}{\overset{\|}{-}}]_{-}[\text{NH}(\text{CH}_2)_3\text{Si}(\text{OC}_2\text{H}_5)_3]_2$$

$$(\text{CH}_3\text{O})_3\text{Si}(\text{CH}_2)_3\text{NH}(\text{CH}_2)_2\text{NH}\overset{\text{O}}{\overset{\|}{\text{C}}}\text{CH}_2\text{CH}_2\text{NH}(\text{CH}_2)_3\text{Si}(\text{OC}_2\text{H}_5)_3$$

$$\text{NH}_2\text{CH}_2\text{CH}_2\text{NH}\overset{\text{O}}{\overset{\|}{\text{C}}}\text{CH}_2\text{CH}_2\text{NH}(\text{CH}_2)_3\text{Si}(\text{OC}_2\text{H}_5)_3$$

$$\text{C}_{18}\text{H}_{37}\text{NH}\overset{\text{O}}{\overset{\|}{\text{C}}}\text{CH}_2\text{CH}_2\text{NH}(\text{CH}_2)_3\text{Si}(\text{OC}_2\text{H}_5)_3$$

$$\text{NH}_2(\text{CH}_2)_2\text{NH}(\text{CH}_2)_2\text{NH}\overset{\text{O}}{\overset{\|}{\text{C}}}\text{CH}_2\text{CH}_2\text{NH}(\text{CH}_2)_3\text{Si}(\text{OC}_2\text{H}_5)_3$$

$$\text{CH}_3\text{NH}\overset{\text{O}}{\overset{\|}{\text{C}}}\text{C}(\text{CH}_3)\text{HCH}_2\text{NH}(\text{CH}_2)_4\text{Si}(\text{OC}_2\text{H}_5)_2\text{CH}_3$$

$$[\text{CCH}_2\text{CH}_2\overset{\text{O}}{\overset{\|}{-}}]_{-}[\text{NH}(\text{CH}_2)_4\text{Si}(\text{CH}_3)_2\text{OCH}_3]_2$$

$$[\text{CCH}_2\text{CH}_2\overset{\text{O}}{\overset{\|}{-}}]_{-}[\text{N}(\text{C}_4\text{H}_9)(\text{CH}_2)_3\text{Si}(\text{OCH}_3)_3]_2$$

$$[\text{C}(\text{CH}_3)\text{CHCH}_2\overset{\text{O}}{\overset{\|}{-}}]_{-}[\text{N}(\text{CH}_3)(\text{CH}_2)_3\text{Si}(\text{OC}_2\text{H}_5)_3]_2$$

$$[\text{CCH}_2\text{C}(\text{CH}_3)\text{H}\overset{\text{O}}{\overset{\|}{-}}]_{-}[\text{NH}(\text{CH}_2)_3\text{Si}(\text{OCH}_3)_3]_2$$

$$[\text{CCH}_2\text{C}(\text{C}_6\text{H}_5)\text{H}\overset{\text{O}}{\overset{\|}{-}}]_{-}[\text{NH}(\text{CH}_2)_3\text{Si}(\text{OC}_2\text{H}_5)_3]_2$$

$$[\text{CCH}_2\text{C}(\text{COOCH}_3)\text{H}\overset{\text{O}}{\overset{\|}{-}}]_{-}[\text{NH}(\text{CH}_2)_3\text{Si}(\text{OCH}_3)_3]_2$$

$$[\text{CCH}_2\text{CH}_2\overset{\text{O}}{\overset{\|}{-}}]_{-}[\text{NHC}(\text{CH}_3)\text{HCH}_2\text{Si}(\text{OC}_2\text{H}_5)_3]_2$$

$$[\text{CCH}_2\text{CH}_2\overset{\text{O}}{\overset{\|}{-}}]_{-}[\text{NHCH}_2\text{Si}(\text{OCH}_3)_3]_2$$

$$[\text{CCH}_2\text{CH}_2\overset{\text{O}}{\overset{\|}{-}}]_{-}[\text{NH}(\text{CH}_2)_2\text{NH}(\text{CH}_2)_3\text{Si}(\text{OCH}_3)_3]_2$$

$$\text{C}_{18}\text{H}_{37}\text{NH}\overset{\text{O}}{\overset{\|}{\text{C}}}\text{CH}_2\text{CH}_2\text{NH}(\text{CH}_2)_2\text{NH}(\text{CH}_2)_3\text{Si}(\text{OCH}_3)_3$$

$$\text{NH}_2\text{CH}_2\text{CH}_2\text{NH}\overset{\text{O}}{\overset{\|}{\text{C}}}\text{CH}_2\text{CH}_2\text{NH}(\text{CH}_2)_2\text{NH}(\text{CH}_2)_3\text{Si}(\text{OCH}_3)_3$$

-continued

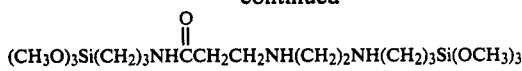

and the like. The most preferred aminoorganosilicon compounds of this invention are the bis-silyl compounds, especially

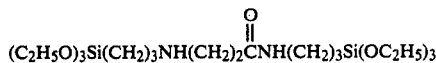

The compositions described above are stable for prolonged periods of time in a closed container. Thus separate packaging is not required. When applied on a ferrous substrate, the zinc-rich formulations dry rapidly with the result that a hard, continuous, smooth film is formed having excellent corrosion protecting properties.

The alkyl silicates used in this invention are known in the art comprising unhydrolyzed alkyl and alkoxyalkyl silicates and alkyl and alkoxyalkyl silicates hydrolyzed up to about 40 percent by weight. Alkyl silicates are produced by the reaction of silicon tetrachloride and alcohols and alkoxy alcohols, generally in a reactor equipped with a stirrer, condenser and vat scrubber. The hydrogen chloride by-product is removed by reflux which may be carried out at reduced or atmospheric pressure. Through this process, the most common products TEOS (tetraethyl orthosilicate), and Cellosolve (Trademark of the Union Carbide Corporation for monoalkyl ethers of ethylene glycol) silicate are made.

Subsequently these products may be partially hydrolyzed by the addition of water and an acid catalyst. The amount of water added determines the degree of hydrolysis in the final product. Commercially available products derived from ethanol include the unhydrolyzed TEOS, Condensed Ethyl Silicate (about 7 percent hydrolysis), Ethyl Silicate 40 (40 percent hydrolysis contaning 40% SiO$_2$), and Ethyl Silicate P-18, having an 80 to 85 percent hydrolysis level.

The term "hardening amount of an aminoorganosilicon acylamino compound" is used in this invention to mean an amount sufficient to afford a dry film of the coating composition when placed on a ferrous substrate under ambient conditions. It has been found that at least about 5% by weight of hydrolyzable silicon compound, based on the weight of partially hydrolyzed organic silicate, is required to obtain a dry film within a practical exposure time, that is, in about 5 to 10 minutes. There is no critical upper limit but for practical purposes there is no advantage in using more than about 50% by weight of hydrolyzable silicon compound. It is preferred to use about 15 to about 45% by weight of hydrolyzable silicon compound.

Although not essential for the practice of this invention, it is preferred that metal protective compositions of this invention include a water scavenging agent. Suitable water scavenging agents include zeolites, silica gel, tetraalkyl silicates, trialkyl borates, and the like. Zeolites are preferred because unlike the others given above the scavenging or water removal action does not produce a reaction product.

The zeolite water-scavenging agent can be any of the well known three-dimensional crystalline zeolites of the molecular sieve type, either naturally-occurring or synthetically prepared by conventional hydrothermal crystallization, and which have pore dimensions large enough to permit the passage of water molecules. Typical of the naturally occurring zeolites are clinoptilolite, chabazite, gmelinite, mordenite, erionite, offretite, phillipsite and faujasite. Illustrative of the synthetic molecular sieve zeolites are zeolite A, U.S. Pat. No. 2,882,243; zeolite X, U.S. Pat. No. 2,882,244; zeolite R, U.S. Pat. No. 3,030,181; zeolite S, U.S. Pat. No. 3,054,657; zeolite T, U.S. Pat. No. 2,950,952; zeolite F, U.S. Pat. No. 2,996,358; zeolite B, U.S. Pat. No. 3,008,803; zeolite M, U.S. Pat. No. 2,995,423; zeolite H, U.S. Pat. No. 3,010,789; zeolite J, U.S. Pat. No. 3,011,809; zeolite Y, U.S. Pat. No. 3,130,007; and zeolite L, U.S. Pat. No. 3,216,789. Advantageously the zeolite selected will have a framework molar SiO$_2$/Al$_2$O$_3$ ratio of less than 50, and preferably less than 20, since the highly siliceous zeolites tend to exhibit organophillic properties to the detriment of their hydrophillic characteristics. Particularly suitable, because of their extremely high water-sorption capacity are the various cation forms of zeolite A. The potassium cation form of zeolite A, moreover, has an effective pore diameter of between 3 and 4 Angstroms and thus is capable of readily adsorbing water but effectively excludes most other molecules in the system on the basis of molecular size.

For use as adsorbents, the zeolites should be at least partially dehydrated, preferably fully dehydrated, by heating in air or vacuum at moderate temperatures of about 250° to 350° C. for several hours. Since zeolite crystals are small, seldomly larger than 10 micrometers, they can suitably be admixed in the coating compositions without adversely affecting its essential properties. Alternatively, the zeolite crystals can be formed into shaped agglomerates with conventional binders such as clays and enclosed in the container in which the product is stored.

The invention is described in the Examples which follow.

All parts and percentages are by weight unless otherwise specified.

The following aminoorganosilicon acylamino compounds are used in the working Examples.

Compund A is the reaction product by Michael addition of gamma-aminopropyltriethoxysilane with methyl acrylate followed by amidation of the reaction product with gamma-aminopropyltriethoxysilane. Compound A has the formula:

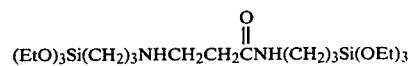

Compound B is the reaction product by Michael addition of gamma-aminopropyltriethoxysilane with ethyl acrylate followed by amidation of the reaction product with ethylenediamine. Compound B has the formula:

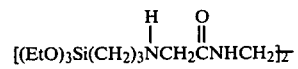

Compound C is the reaction product by Michael addition of N-beta(aminoethyl)-gamma-aminopropyltrimethoxy silane with methyl acrylate followed by amidation of the reaction product with N-beta(aminoethyl)-gamma-aminopropyltrimethoxysilane. Compound C has the fomula:

Compound D is the reaction product by Michael addition of one mole of gamma-aminopropyltrimethoxysilane with ½ mole of methyl acrylate. Compound D has the formula:

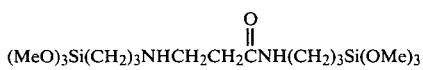

Compound E is the reaction product by Michael addition of one mole of gamma-aminopropyltrimethoxysilane with one mole of methyl acrylate followed by amidation of the reaction product with ½ mole of ethylenediamine. Compund E has the formula:

EXAMPLE 1

SINGLE-PACKAGE ZINC-RICH COATING WITH ETHYL SILICATE 40 AND COMPOUND A

A ferrous metal coating composition was prepared by mixing 155.2 g. of partially hydrolyzed ethyl polysilicate containing 40% by weight of $SiO_2$ (Ethyl Silicate 40) with 38.8 grams of Compound A and 892.5 grams of finely divided zinc having a particulate size of about 2 to about 15 microns (American Smelting and Refining Co. ASCARO-L-15), and 74 grams of a finely divided extender (Water-Ground Mica 325 from The English Mica Co.). In addition, in order to maintain the mixture in an anhydrous state, 7.5 grams of a water scavenging agent (Union Carbide Corp. molecular sieves 4A) were added and the composition was thinned with 293.5 grams of Cellosolve (Trademark of Union Carbide Corp. for ethylene glycol monoethyl ether).

Twenty-four grams of MPA-60X (an hydrogenated caster oil sold by N. L. Industries) was also added as an antisettling agent together with 15.5 grams of a thickener (Ethocel Medium Premium 100 sold by Dow Chemical Co.) as a viscosity regulator. The resultant ethyl silicate liquid protective coating or primer paint had a package stability of over 3 months. When this point was applied, by spraying, to sand blasted, cold-rolled steel panels measuring approximately 4 inches by 4 inches by ⅛ inch, there was obtained a smooth hard film which dried in less than 10 minutes under ambient conditions. The steel panels so coated was subjected for 1000 hours at salt spray (ASTM Method B-117) and there was no evidence of corrosion or other signs of failure on the panels so coated.

EXAMPLE 2

SINGLE-PACKAGE ZINC-RICH COATING WITH ETHYL SILICATE 40 AND A DIFFERENT RATIO OF COMPOUND A

A ferrous metal coating composition was prepared as in Example 1, by mixing 174.6 grams of Ethyl Silicate 40 with 19.4 grams of Compound A, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 3

SINGLE-PACKAGE ZINC-RICH COATING WITH ETHYL SILICATE 40 AND COMPOUND B

A ferrous metal coating composition was prepared as in Example 1 by mixing 155.2 grams of Ethyl Silicate 40 with 38.8 grams of Compound B, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 4

SINGLE-PACKAGE ZINC-RICH COATING WITH ETHYL SILICATE 40 AND A DIFFERENT RATIO OF COMPOUND B

A ferrous metal coating composition was prepared as in Example 1 by mixing 174.6 grams of Ethyl Silicate 40 with 19.4 grams of Compound B, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. Whn these panels were subjected to a salt spray and water immersion for 1000 hours, they showed no evidence of corrosion or other failure.

EXAMPLE 5

SINGLE-PACKAGE ZINC-RICH COATING WITH ETHYL SILICATE 40 AND COMPOUND C

A ferrous metal coating composition was prepared as in Example 1 by mixing 155.2 grams of Ethyl Silicate 40 with 38.8 grams of Compound C, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 6

SINGLE-PACKAGE ZINC-RICH COATING WITH ETHYL SILICATE 40 AND A DIFFERENT RATIO OF COMPOUND C

A ferrous metal coating composition was prepared as in Example 1 by mixing 174.6 grams of Ethyl Silicate 40 with 19.4 grams of Compound C, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 7

SINGLE-PACKAGE ZINC-RICH COATING WITH ETHYL SILICATE 40 AND COMPOUND D

A ferrous metal coating composition was prepared as in Example 1 by mixing 155.2 grams of Ethyl Silicate 40 with 38.8 grams of Compound D, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 8

SINGLE-PACKAGE ZINC-RICH COATING WITH ETHYL SILICATE 40 AND A DIFFERENT RATIO OF COMPOUND D

A ferrous metal coating composition was prepared as in Example 1 by mixing 174.6 grams of Ethyl Silicate 40 with 19.4 grams of Compound D, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 9

SINGLE-PACKAGE ZINC-RICH COATING WITH ETHYL SILICATE 40 AND COMPOUND E

A ferrous metal coating composition was prepared as in Example 1 by mixing 155.2 grams of Ethyl Silicate 40 with 38.8 grams of Compound E, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 1000 hours, they showed no evidence of corrosion or other failure.

EXAMPLE 10

SINGLE-PACKAGE ZINC-RICH COATING WITH ETHYL SILICATE 40 AND A DIFFERENT RATIO OF COMPOUND E

A ferrous metal coating composition was prepared as in Example 1 by mixing 174.6 grams of Ethyl Silicate 40 with 19.4 grams of Compound E, 892.5 grams of finely divided zinc dust (ASARCO L-15), 7.5 grams of a water scavenging agent (Union Carbide Molecular Sieves 4A), 74 grams of Mica 325, 24 grams of MPA-60-X, and 293.5 grams of Cellosolve.

The resultant primer paint was stable for 3 months in storage. When applied to sand blasted steel panels as in Example 1, the coating dried to a hard film in less than 10 minutes. When these panels were subjected to a salt spray and water immersion for 100 hours, they showed no evidence of corrosion or other failure.

Although the invention has been described in its preferred forms with a certain degree of particularity, it is understood that the present disclosure has been made without departing from the spirit and scope of the invention.

What is claimed is:

1. A composition for protecting ferrous metals from corrosion comprising particulate zinc, an unhydrolyzed or a partially hydrolyzed organic silicate hydrolyzed up to about 40% and a hardening amount of an aminoorganosilicon acylamino compound having the formula:

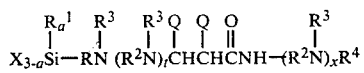

wherein:
X is an alkoxy radical having 1 to 6 carbon atoms;
R is a alkylene radical having 1 to 4 carbon atoms;
$R^1$ is hydrogen or an alkyl radical having 1 to 4 carbon atoms;
$R^2$ is an alkylene radical having 2 to 4 carbon atoms;
$R^3$ is a monovalent radical selected from the group consisting of hydrogen alkyl having 1 to 20 carbon atoms or phenyl;
$R^4$ is a monovalent radical selected from the group consisting of alkyl having 1 to 20 carbon atoms, phenyl or silyl having the formula:

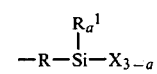

wherein X, R and $R^1$ are as defined above;
Q is a monovalent radical selected from the group consisting of hydrogen, alkyl having 1 to 4 carbon atoms, phenyl or an ester radical having the formula $—COOR^5$ wherein $R^5$ is alkyl having 1 to 4 carbon atoms;
a is an integer having values of 0 to 2 and t and x are each integers having a value of 0 to 4, with the proviso that when x is at least 1, $R^4$ can also be hydrogen.

2. Composition claimed in claim 1 wherein $R^3$ is hydrogen, Q is hydrogen, t is 0, or 1, x is 0 and $R^4$ is alkyl.

3. Composition claimed in claim 1 wherein $R^3$ is hydrogen Q is hydrogen, t is 0 or 1, x is 1 and $R^4$ is hydrogen or alkyl.

4. Composition claimed in claim 1 wherein $R^3$ is hydrogen; Q is hydrogen; t is 0 or 1; x is 0 and $R^4$ is a silyl radical of the formula

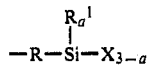

wherein R, $R^1$ and X and a are the same as defined above.

5. Composition claimed in claim 4 wherein a is 0; t is 0; R is —CH$_2$CH$_2$CH$_2$—; and X is an alkoxy radical selected from the group consisting of methoxy, ethoxy, 2-ethoxyethoxy and 2-methoxyethoxy radicals.

6. Composition claimed in claim 5 wherein X is a methoxy radical.

7. Composition claimed in claim 5 wherein X is an ethoxy radical.

8. Composition claimed in claim 1 wherein $R^3$ is hydrogen; Q is hydrogen; t is 0 or 1; x is 1 and $R^4$ is a silyl radical of the formula

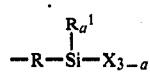

wherein R, $R^1$ and X and a are the same as defined above.

9. Composition claimed in claim 8 wherein a is 0; t is 1; R is —CH$_2$CH$_2$CH$_2$—; $R^2$ is —CH$_2$CH$_2$— and X is an alkoxy radical selected from the group consisting of methoxy, ethoxy and 2-methoxyethoxy radicals.

10. Composition claimed in claim 9 wherein X is a methoxy radical.

11. Composition claimed in claim 9 wherein X is an ethoxy radical.

* * * * *